March 18, 1941.   H. P. ROCKWELL, JR   2,235,590
APPARATUS FOR DETERMINING PROPER EXPOSURE IN
MAKING PHOTOGRAPHIC PRINTS
Filed April 24, 1939   4 Sheets-Sheet 3

INVENTOR
Harvey P. Rockwell, Jr.,
BY
ATTORNEYS

March 18, 1941.   H. P. ROCKWELL, JR   2,235,590
APPARATUS FOR DETERMINING PROPER EXPOSURE IN
MAKING PHOTOGRAPHIC PRINTS
Filed April 24, 1939   4 Sheets-Sheet 4

INVENTOR
Harvey P. Rockwell, Jr.,
BY
ATTORNEYS

Patented Mar. 18, 1941

2,235,590

UNITED STATES PATENT OFFICE 2,235,590

APPARATUS FOR DETERMINING PROPER EXPOSURE IN MAKING PHOTOGRAPHIC PRINTS

Harvey P. Rockwell, Jr., Newark, N. J., assignor to Weston Electrical Instrument Corporation, a corporation of New Jersey Application April 24, 1939, Serial No. 269,762

14 Claims. (Cl. 88—14)

This invention relates to the making of positives from photographic negatives and more especially to an apparatus for determining the proper grade of positive emulsion to be used and the proper exposure to be given in making a print on that emulsion from a particular negative.

Because of the fact that photographic negatives vary from one another in the differences between maximum density and minimum density and also vary from one another in the absolute values of their densities, much time and material are ordinarily wasted in selecting the proper grade of paper to use and in determining the proper amount of exposure to give.

This arises because of the great difficulty in estimating correctly the controlling factors by observation and experience and because none of the many systems so far devised operates even as well as the judgment of an experienced operator.

Positive emulsions differ from one another in the increment of exposure necessary to go from a minimum useful gray to a maximum useful black and also differ from one another in the amount of exposure required to produce a predetermined gray. The photographic negative which is inserted between the printing light and the positive emulsion and determines the ratio of the printing light that reaches the positive also has two similar variables, namely the difference in density between the most opaque portion and the least opaque portion and the absolute density of either of these portions. Negatives and positive emulsions taken at random will vary greatly in these respects and it is difficult to determine for a particular negative the grade of paper which will match the negative by utilizing the full range of light transmitted by the negative and with this full range will produce the lightest useful gray at one end and the darkest useful black at the other end. Also it is difficult to determine how long to expose that particular positive emulsion to the amount of printing light transmitted by the particular negative.

I have devised an apparatus for use in a complete process which will obviate these difficulties. This complete process includes the grading of positive emulsions in accordance with the increment of exposure necessary to proceed from the lightest useful gray to the darkest useful black and also in accordance with the relative amounts of exposure necessary properly to expose each different paper. It also includes, by the use of my apparatus, a determination of the intensity of the printing light, the ratio of light transmitted by the most opaque part of the negative and the ratio of light transmitted by the least opaque part of the negative, and correlation of these values with the values pertinent to the positive emulsions so that the grade of paper and the exposure time in seconds are given by the apparatus directly and the person making the prints is relieved of the necessity of making those time-consuming estimates which would be necessary in the absence of my invention in order to make satisfactory prints.

In the accompanying drawings I have illustrated preferred forms of my apparatups and also a graph explanatory of part of the complete process.

Figure 1:
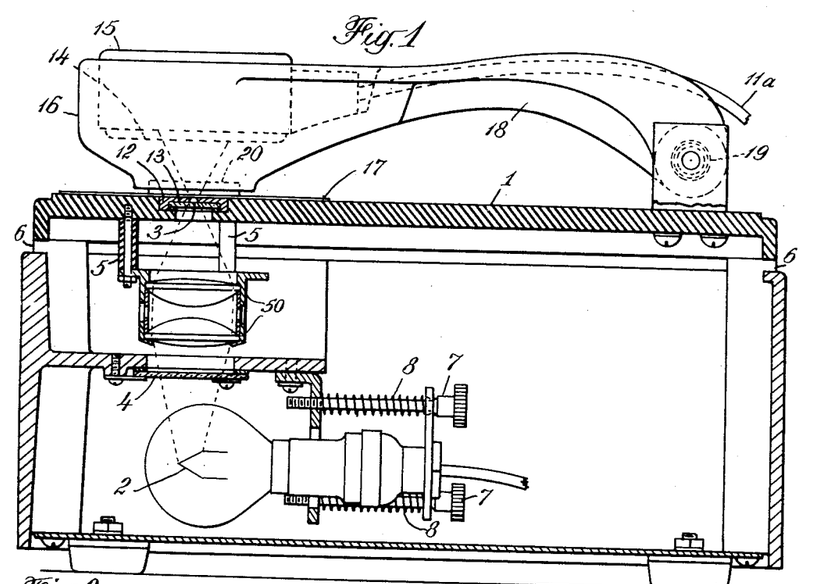
Fig. 1 is in part an elevation and in part a sectional elevation along the lines 1—1 of Fig. 2, of the apparatus used for measuring the densities of the negative and the intensity of the printing light and for indicating the grade of paper to be used and the time of exposure to be given.
Figure 2:
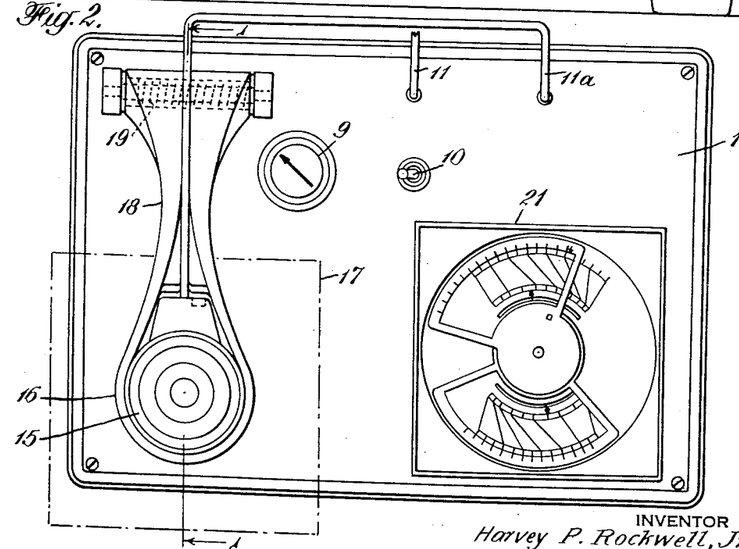
Fig. 2 is a plan view of the same.
Figure 3:
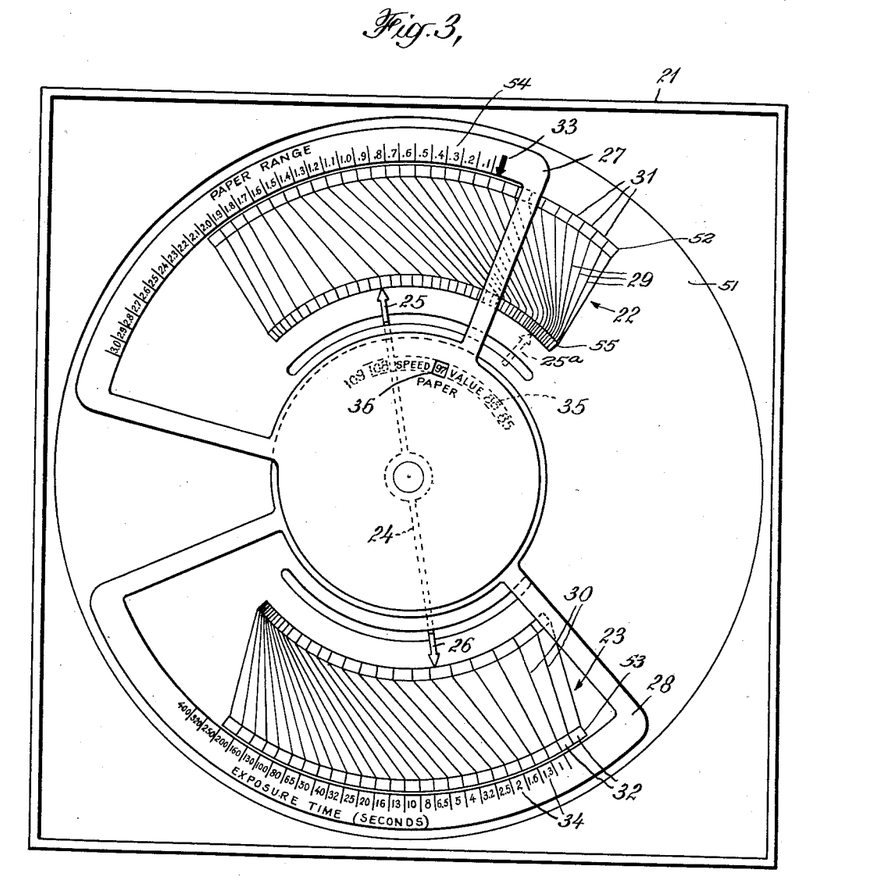
Fig. 3 is a larger illustration of the meter portion of said apparatus.

The apparatus as illustrated in Figs. 1, 2 and 3 consists of an opaque container 1 within which is mounted an optical system and a concentrated source of light 2 which is focused on a small aperture 3. The optical system in addition to suitable lenses 50 includes a filter 4 which favors the transmission of the blue end of the visible spectrum in comparison with the red end and also tends to exclude the intra red and heat frequencies. This filter thus serves two functions, namely it tends to transmit only the character of light to which printing papers are most sensitive and it also tends to exclude from the negative the heat which would injure the negative in an apparatus such as this where the light from a relatively intense source is concentrated on a small area of the negative.

The supports for the optical system preferably should be insulated, for example by insulating coatings or sleeves 5 so that they will not transmit an undue amount of heat to the negative, and the container preferably is vented as at 6 to permit escape of heat.

Any convenient source of concentrated light of suitable strength is used. As shown it consists of an electric lamp having a concentrated filament. It should be mounted so as to permit the concentrated source of light to be located in the optical system so that it will be focused at the small aperture 3. As shown in the figures, this is accomplished by means of the adjustable supports 7, 8, of which there are three. These accomplish this by moving the lamp in any direction, as the screws 7 are selectively adjusted against the springs 8.

Figure 4:
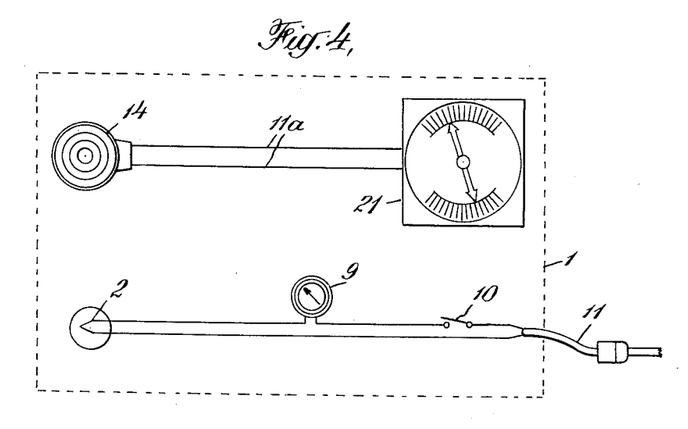
Fig. 4 shows the circuit connections of the apparatus.

The circuits are schematically shown in Fig. 4. A suitable series rheostat 9, the control knob of which is shown in Fig. 2, may be provided to control the brightness of the light source. A suitable switch 10, the control handle of which is shown in Fig. 2, is provided to interrupt the circuit of the light source. In Fig. 2 the exterior leads from the light source are shown at 11, and the exterior leads from the meter to the photoelectric cell are shown at 11a.

The aperture 3 is very small compared to the size of the negative; a suitable size for most purposes is 1.5 mm. diameter. It is preferably beveled as shown and may conveniently be formed in a plug 12 which is set into the surface of the container. The plug 12 may be made removable so that other plugs having holes of different sizes may be inserted to enable the instrument to measure negatives of greater density with the same light source, although, of course, there will be some sacrifice of accuracy if the aperture is made too large. Between the aperture and the optical system there is included preferably a diffuser 13 such as ground glass, but this may be omitted if desired.

Immediately above the aperture 3 is mounted a photo-electric cell 14 which will generate a current proportional to the value of the illumination which reaches it. Preferably the cell is mounted so that it is a substantial distance above the aperture, inasmuch as somewhat better results are secured if the light which passes through the negative 17 from the aperture spreads out over a larger area of the cell. The cell is held in a casing 15 and this in turn in a support 16, which preferably is movable away from the negative, for example by means of a hinged arm 18. As shown, this contains a spring 19 which, together with friction, balances the support in any desired position. The face of the support which comes into contact with the negative may be covered with a soft ring 20 of some substance such as felt which will not scratch the negative.

The cell casing is releasably held in the support 16 by any suitable means, for example friction, so it can be removed and placed approximately in the position to be occupied by the paper or other printing medium in the path of the printing light.

The photo-electric cell is directly connected at all times in circuit with a meter so that the current generated in the cell by the incident light will produce a suitable indication on the meter. By having the cell releasably held in the support 16 and permanently connected in circuit with the meter, the same apparatus will measure the densities of the negative and also the value of the illumination effective on the printing plane, thus making not only for convenience but also eliminating the errors which may arise from using different instrumentalities for the two purposes.

As illustrated in Figs. 2 and 3, the meter 21 consists of a scale 51 bearing two scale markings 22 and 23, a movable member 24 having pointers 25 and 26 at two extremities thereof, a rotatable dial member 27 cooperating with the uniform scale divisions 31 of the scale markings 22, a rotatable dial member 28 cooperating with the uniform scale divisions 32 of the scale markings 23, and any suitable means for actuating the movable member in response to current from said photo-electric cell. Ordinarily the actuating mechanism for the movable member will not move the pointers 25 and 26 equal arcs along scale arcs 55 and 56 for equal increments of current and therefor the scale arcs 52 and 53 with lead lines such as 29 and 30 of varying angularity are provided to convert the non-uniform movement of the pointers into uniform scale divisions such as 31 and 32 which are angularly equal to one another. The scale arc 55 is divided to correspond to movements of the pointer 25 when the photo-electric cell is exposed to light passing through the negative and the scale arc 56 is divided to correspond to movements of the pointer 26 when the photo-electric cell is exposed to the printing light. The position of the pointer 25 will correspond to different densities in the negative and these density values may be placed in the uniform scale divisions 31 if desired. The position of pointer 26 will correspond to the illumination from the printing light and these values may be placed in the uniform scale divisions 32 if desired. On the movable dial 27 there is placed an indicator 33 and uniform dial divisions 54 the equal divisions of which register with the uniform scale divisions 31. Numbers corresponding to the paper range (as will be hereinafter more fully explained) are placed in the appropriate ones of divisions 54. With uniform dial divisions 54 and uniform scale divisions 31 thus arranged and with the indicator 33 set opposite the particular division which the pointer 25 indicates when the maximum density of the negative is being measured (shown, for example, by dotted pointer 25a), the grade of paper to be used will be given by the number in that one of the dial divisions 54 which is indicated by the pointer 25 when the minimum density of the negative is being measured. It will be understood that the number on dial division 54 is indicated in the sense that it lies opposite that one of the scale divisions 31 which is connected by lead line to the position of pointer 25.

The other movable dial, namely the dial 28, is laid off with uniform divisions 34 equal to the uniform dial divisions of scale arc 53 (thus making divisions 31, 54, 32 and 34 all angularly equal) and these divisions on dial 28 will bear numbers which, when the apparatus is properly employed, will denote the number of seconds exposure to be given. On either the dial 27 or the dial 28 is placed a series of numbers corresponding to the sensitivities of the papers or other positive emulsions which are available for use. These numbers are arranged in uniform divisions angularly equal to the other uniform divisions heretofore mentioned and are arranged on the arc of a circle concentric with the other uniform divisions 31, 54, 32 and 34. As shown, these dial markings 35 are on the movable dial 28. Dial 27, which overlies the central portion of dial 27 on which the dial markings 35 appear, has a window 36 therein which will expose to view any desired one of the numbers of dial markings 35.

The numbers of the dial markings 35 must, of course, proceed in the proper direction corresponding to the other markings (as shown, they increase counterclockwise). Their specific location on the dial 28 is not critical provided they are properly related to the location of the window 35 on dial 27 and also to the location of the numbers in the uniform dial divisions 34. This relative location having once been made correct, thereafter the proper number of seconds exposure will always be indicated on dial markings 34 by the pointer 26 when the photo-electric cell is acted on by the printing light and if the dial 28 has been previously set to cause the proper paper speed to appear in the window 36 when the indicator 33 is opposite the division of scale arc 52 which was indicated by the pointer 25 when maximum density was being measured.

This meter, in combination with the rest of the apparatus, thus forms an instrument which will indicate not only the proper grade of paper to be used for a particular negative, but also the proper printing time to be given for that negative on the particular paper with the particular printing light which is employed.

In using this apparatus the operator takes any desired negative and inspects it by holding it in the diverging beam of light which emerges from the aperture 3 when the cell mounting 16 is withdrawn from contact therewith. By using this beam of light the operator can select those portions of the negative which he considers the most dense and the least dense so as to determine the maximum and minimum densities. An experienced operator will readily select these points, but even an inexperienced operator will, by making several measurements, arrive readily at the actual maximum and minimum densities. Having selected the point of maximum density which is to be measured, the operator lowers the negative toward the aperture 3 so that that point comes directly over the aperture, then places the cell mounting in contact with the negative. The light which passes through the aperture and negative to the photo-electric cell then generates a current which is proportional to the transmitted light and causes the pointer 25 to give an indication on the scale marking 22, for example as shown by dotted pointer 25a. The operator then sets the indicator 33 at that one of the divisions on uniform scale divisions 31 which is connected by a lead line with the position of the pointer 25a. The operator then similarly selects the point of minimum density on the negative and similarly places it over the aperture 3 with the cell in position so that the pointer 25 gives an indication corresponding to the amount of light which passes through the negative at this point. The operator then observes on uniform dial divisions 54 the number which registers with the division indicated by the pointer 25. As illustrated in Fig. 3, this number is 1.3 or 1.4. This number, as has been stated, denotes the grade of paper which will reproduce the full range of the negative and will use the full "tone" range of the paper in so doing and is called the "paper range." The operator leaves dial 27 where it is but moves dial 28 until the number (on dial marking 35) which corresponds to the sensitivity of the paper appears in window 36. Then the operator detaches the casing 15 with its photo-electric cell from the mounting 16 and places the cell in the path of the printing light in the position which is to be occupied by the paper or other positive emulsion. The pointer 26 will then give an indication which corresponds to the illumination of the printing light and the operator then reads from dial 28 the number appearing in that one of dial divisions 34 which registers with the division of scale marking 23 which is indicated by the pointer 26. This number is the number of seconds exposure which the operator must give with that particular negative and that particular printing light in order to secure a proper print on the particular paper or other positive emulsion.

Figure 5:
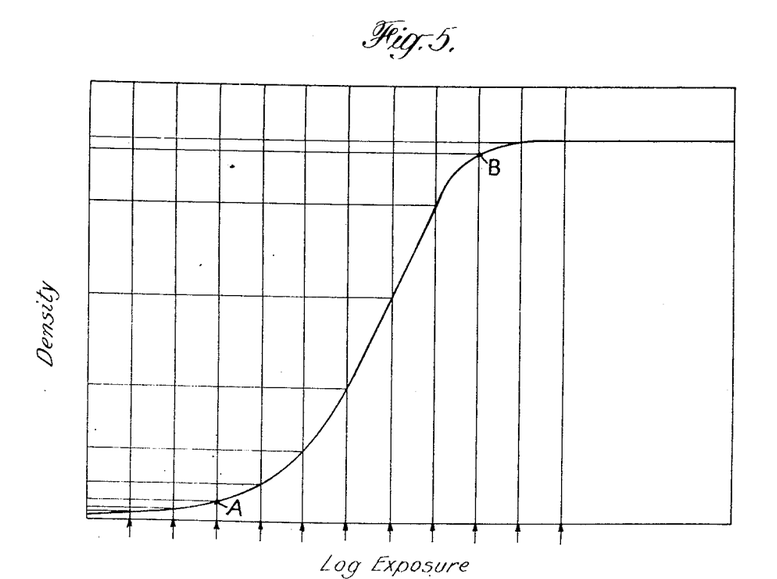
Fig. 5 is a curve illustrating the characteristic of positive emulsions such as printing papers.

Reference has been made in the foregoing description of the apparatus to the "paper range" as indicative of the grade of paper to be selected and "paper speed value" as a measure of the sensitivity of the selected paper. These characteristics or factors of the paper or other positive emulsion may be determined by the user of the apparatus for himself or may be determined by the manufacturer of the paper or other positive emulsion and marked directly on the containers for the same. The method of determining the paper range may be better understood by considering Fig. 5. In this figure equal distances along the abscissa axis correspond to equal increments in the logarithm of the exposure and the equal distances along the ordinate axis correspond to equal increments in the density of the positive resulting therefrom. "Density" in this connection is the logarithm of the opacity and indicates the relative blackness of the positive photographic emulsion as determined by reflected light. In the case of a positive transparency, of course, the density is determined by transmitted light. It will be seen by examination of the curve in Fig. 5 that the positive emulsion can be subjected to a number of successive increments of exposure before any appreciable density difference appears corresponding to the increments of exposure. This means that when exposures of these values are given to the positive emulsion, the resulting positive will not give useful or appreciable differences in the highlights of the positive and this region is therefore comparatively useless for reproducing the light tone values in the subject even though they may be satisfactorily reproduced in the negative. A point A is reached, however, where a unit increment of light does produce an appreciable density difference in the positive. This point I call the first significant point and the rate of change of the characteristic curve at this point I call the first significant gradient. It will be noted that the shape of the characteristic curve is such that the gradient continues to increase and therefore the positive will usefully distinguish the gradations of the negative until a point B is reached, on what is known in the photographic industry as the shoulder of the curve, where the gradient reduces to a value where unit increments of exposure do not produce useful appreciable differences in the black tones of the positive. The point at which this occurs I call the second significant point and the rate of change of the characteristic curve at this point I call the second significant gradient. The exposure range between these two points represents the useful range of the paper. The difference in the logarithm of the exposure necessary to produce a black at the second significant gradient and the exposure necessary to produce a faint gray at the first significant gradient is the "paper range" as herein used by me in describing the apparatus. The exposure necessary to produce a faint gray at the first significant gradient is the "sensitivity" of the paper as herein used by me. For most purposes it is more convenient to use a number, which I have called the "paper speed value," derived from this exposure than it is to use the exposure itself and I prefer to calibrate my apparatus in accordance with the following equation:

$$\text{Paper speed value} = 10\left(10 + \log\frac{1}{e}\right)$$

where $e$ is the exposure necessary to reach the density of the positive at the first significant gradient.

Throughout the foregoing discussion the terms "paper" and "positive emulsion" have been used somewhat interchangeably and it will be understood that the process and apparatus are equally applicable to positive prints on paper which are viewed by reflected light and positive prints on transparent supports which are viewed by transmitted light and also are applicable to the production of separation negatives from color transparencies and other similar purposes which will at once be apparent to the photographer where it is necessary to suit a printing medium to a negative. The term "printing paper" as used in the claims is intended to include all such cases.

Certain modifications of the apparatus may be made and still utilize the special advantages of the foregoing process. For example, in order to handle negatives of great density, it may be desirable to increase the intensity of the light source or substitute a photo-electric cell giving a greater response or substitute a meter which is more sensitive or change the range of the meter to a more sensitive range. An alternative method which under some circumstances is equally satisfactory and much more simple is to substitute a larger aperture for the aperture 3, as has already been pointed out. This also has the advantage of enabling a person to read half-tone negatives and thereby average the screen.

The characteristics of the filter 4 may be altered to match the color temperature of the light source to the photographic emulsion which is to be used. In some circumstances this filter may be omitted entirely, but this will usually be found to be undesirable.

The measurements which are made will be indicative of the diffuse densities of the negative and the grading of the paper will be made on that basis. In some cases where it becomes desirable to utilize these negative densities with specular illumination, as in the case of a condenser enlarger, the specular density may be measured by removing the diffusing glass or the diffuse density may be measured with the glass in place and the well-known conversion factor may be employed or the scale of the instrument can be calibrated in terms of specular densities instead of diffuse densities.

Figure 6:
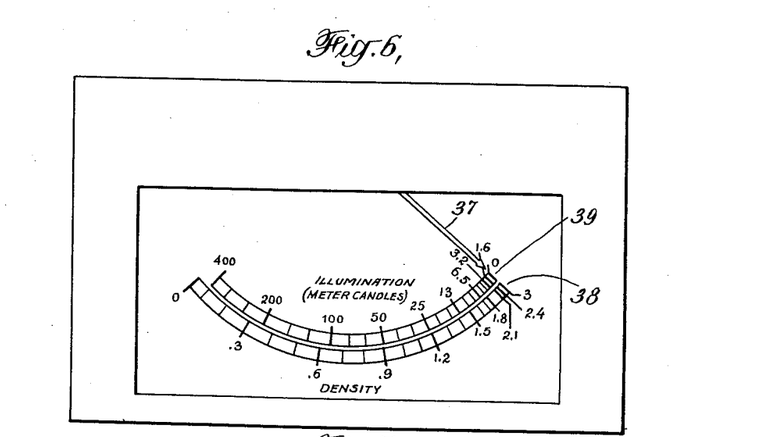
Fig. 6 shows an alternative form of meter.

A modified form of meter is illustrated in Fig. 6. So that the size of the meter can be somewhat reduced, this meter has only one pointer 37 instead of two and the scale markings 38 which indicate density lie side by side with the scale markings 39 which indicate illumination on the printing surface from the printing light. Under these circumstances it has been found desirable to calibrate the scales directly in terms of the negative densities and the illumination from the printing light and to use a separate device for determining from these values the grade of paper to be used and the exposure time to be given.

Figure 7:
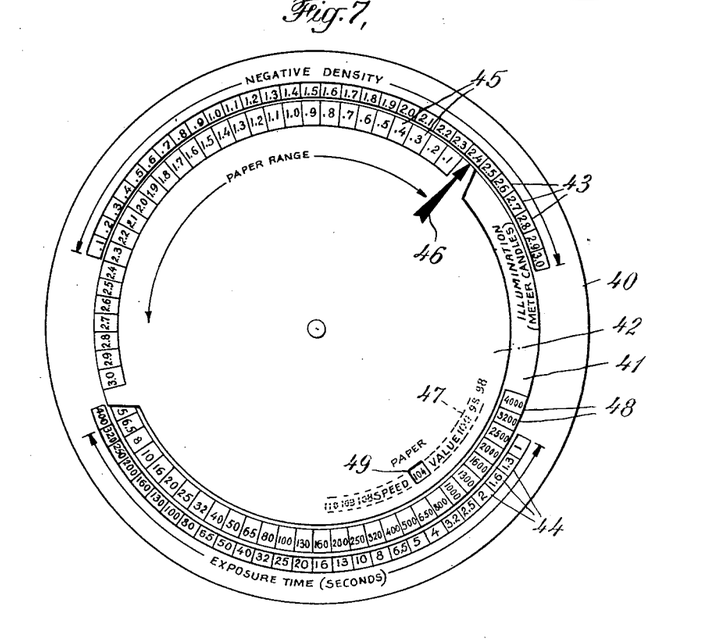
Fig. 7 shows a device which correlates the information given by the form of meter shown in Fig. 6 with positive emulsion characteristics.

As illustrated in Fig. 7, this device consists of three concentric discs 40, 41 and 42 rotatable relative to one another. A part of the surface of bottom disc 40 is laid off in equal radial divisions 43 and in each of these divisions is placed a number (herein referred to as density numbers) which corresponds to the negative density and thus corresponds to the density scale markings 38 on the meter shown in Fig. 6. A part of the remainder of the surface of this disc is divided into similar equal radial divisions 44 and in each of these divisions is placed a number (herein referred to as exposure numbers) which corresponds to the number of seconds exposure to be given. The top disc 42 is also laid off in similar equal radial divisions 45 (equal to one another and angularly equal to the other divisions 43 and 44) and these divisions contain the same series of numbers as the negative density numbers in divisions 43 but the numbers proceed around the arc in the opposite direction and are referred to herein as the paper range numbers. This disc 42 also contains an indicator 46 which is in the radial division next to the numeral ".1". Because the disc 42 is rotatable with respect to the disc 40, this indicator may be set in registration with any desired density number on the disc 40. If it is set opposite the density number corresponding to the maximum density indicated by the meter for a particular negative, the density difference of the negative will be shown on the disc 42 opposite the density number which corresponds to the minimum density value given by the scale 38 of the meter shown in Fig. 6. This density difference corresponds to the "paper range" and is a number which indicates the grade of paper, or other positive emulsion, to be used in printing from the particular negative when the paper range has been determined in accordance with the process previously explained herein. The intermediate disc 41 is also laid off in similar equal radial divisions and bears two sets of numbers 47 and 48 on arcs of different radius. The numbers 47 correspond to the sensitivity of the paper and will be referred to as the paper speed numbers. These lie under a portion of the disc 42 except where a window 49 occurs in that disc. This window is provided so that only one of the paper speed numbers is exposed to view at a particular time. The numbers 48 on the intermediate disc 41, or at least a useful portion thereof, are not obscured by the top disc 42 and correspond to illumination produced by the printing light as measured by scale 39 of the meter shown in Fig. 6. These numbers are referred to as the illumination numbers.

In use the operator sets the indicator 46 opposite the density number in divisions 43 indicated by the meter of Fig. 6 as the maximum density for a particular negative. He then reads the paper range from the paper range numbers by noting the one which is opposite that one of the density numbers 43 which corresponds to the minimum density of the negative as measured by the meter of Fig. 6. This indicates to the operator the grade of paper to be used. The operator then rotates disc 41 until window 49 exposes to view the number corresponding to the sensitivity of the indicated paper. The operator, having measured (by means of the photo-electric cell and the meter of Fig. 6) the illumination at the printing position, i. e., the position which is to be occupied by the paper or other positive emulsion, then reads from disc 40 the exposure number which registers with the illumination number on disc 41 which was indicated by the meter when the illumination at the printing position was measured. This value is the number of seconds exposure to be given the particular paper with the particular printing light in order to make a correct print from the particular negative.

Modifications of the foregoing apparatus and the uses to which it may be put will at once be apparent to those skilled in the art without departing from the scope of my invention.

In using the above apparatus, the intensity of the light source 2 should be a fixed value and this can be insured by adjusting the rheostat 9 until the meter indicates 0 on the density scale of the meter shown in Fig. 6, or the extreme left division of the density scale of the meter shown in Figs. 2 and 3, with no negative in place.

I claim:

1. A device useful in determining the proper exposure in photographic printing comprising an opaque container having a small aperture in one surface, a source of light within said container, means for concentrating a substantial portion of said light on said small aperture, a photoelectric cell, a support for said photoelectric cell for holding it above said aperture in position to receive the light that passes through said aperture and through a selected portion of a negative placed between said aperture and said cell, releasable retaining means in said support to hold said photoelectric cell in place in said support and to permit it to be readily removed therefrom and replaced therein without disconnecting it from its electrical connections, flexible electrical connections permanently connected to said photoelectric cell of sufficient length to permit said photoelectric cell upon being removed from said support to be placed in the position to be occupied by a printing paper in the path of the printing light, and a meter connected in circuit with said photoelectric cell by said flexible connections to measure the response of said cell to the light passing through the selected portion of the negative when the cell is held in said support and to measure the illumination from the printing light when the cell is placed in the position to be occupied by the printing paper.

2. A device useful in determining the proper exposure in photographic printing comprising an opaque container having a small aperture in one surface, a source of light within said container, means for concentrating a substantial portion of said light on said small aperture, a photoelectric cell, a support for said photoelectric cell for holding it above said aperture in position to receive the light that passes through said aperture and through a selected portion of a negative placed between said aperture and said cell, means for movably mounting said support on said container, said means being constructed and adapted to permit said support and the cell held thereby to be moved away from its position over said aperture whereby ample space is available between said aperture and said cell to examine a negative by the light coming through said aperture and to select the spot, the density of which is to be measured, and to place the selected spot in position over said aperture before bringing said cell with its support into position over said aperture, releasable retaining means in said support to hold said photoelectric cell in place in said support and to permit it to be readily removed therefrom and replaced therein without disconnecting it from its electrical connections, flexible electrical connections permanently connected to said photoelectric cell of sufficient length to permit said photoelectric cell upon being removed from said support to be placed in the position to be occupied by a printing paper in the path of the printing light, and a meter connected in circuit with said photoelectric cell by said flexible connections to measure the response of said cell to the light passing through the selected portion of the negative when the cell is held in said support and to measure the illumination from the printing light when the cell is placed in the position to be occupied by the printing paper.

3. A device in accordance with claim 2 in which the means for concentrating the light is an optical system which focuses the light substantially at the aperture so that after passing through said aperture it forms a divergent beam in which the negative may be examined and the spot, the density of which is to be measured, may be selected.

4. A device in accordance with claim 2 in which the means for concentrating the light is an optical system which focuses the light substantially at the aperture so that after passing through said aperture it forms a divergent beam in which the negative may be examined and the spot, the density of which is to be measured, may be selected and in which said support for said cell is so constructed that when holding said cell in position for measuring the density of the selected spot it holds said cell a substantial distance above said aperture so that the light from said aperture spreads over an area of said cell substantially greater than the area of said aperture.

5. A device in accordance with claim 1 in which the means for concentrating the light is an optical system which focuses the light substantially at the aperture so that it forms a divergent beam after passing through the aperture and in which said support for said cell is so constructed that when holding said cell in position for measuring the density of the negative it holds said cell a substantial distance above said aperture so that the light from said aperture spreads over an area of said cell substantially greater than the area of said aperture.

6. A device in accordance with claim 1 in which said meter has two scales, one scale being in densities to indicate the densities of different portions of the negative inserted between said aperture and said photoelectric cell and the other scale being in units to measure the illumination of the printing light when said cell is placed so as to intercept a portion of said printing light at the location to be occupied by the paper in printing.

7. A device in accordance with claim 1 in which said meter has two scales, one scale being in densities to indicate the densities of different portions of the negative inserted between said aperture and said photoelectric cell and the other scale being in units to measure the illumination of the printing light when said cell is placed so as to intercept a portion of said printing light at the location to be occupied by the paper in printing, and in which said two scales are substantially diametrically opposite to one another and on which radial divisions corresponding to equal increments are uniformly spaced and in which the meter has a single movable member extending in two radial directions from the pivot to form two pointers which cooperate with said two scales respectively whereby each scale has a separate pointer, lead lines from the uniform divisions of each scale to the corresponding position of its pointer, a first movable dial member rotatable about the center of the two scales of the meter and bearing an indicator which can be set in registration with that one of the uniform divisions on the density scale which corresponds to the position of the pointer when it is indicating the maximum density of the negative and also bearing, at a point removed from said indicator, notations corresponding to the grade of paper which will reproduce the density difference of the negative, said notations being spaced so as to register with the divisions of the density scale and so that one of them will be indicated by the pointer when it indicates the minimum density of said negative, a second movable dial member rotatable about the center of the two scales of the meter and bearing numbers which correspond to the number of seconds exposure to be given and which are spaced in regular increments in radial divisions equal to the other radial divisions and register radially with the divisions of the illumination scale whereby when the pointer which cooperates with the illumination scale of the meter is indicating the illumination of the printing light it will simultaneously indicate a number of seconds on said exposure scale, an additional series of numbers on one of said movable dial members which numbers correspond to the paper sensitivity and are spaced on the arc of a circle having its center in common with said movable dial members and in radial divisions equal to the other radial divisions, means carried by the other of the said movable dial members for selectively indicating only one of said sensitivity numbers at a time, whereby, after said first dial member is set so that its indicator is positioned in accordance with the maximum density of the negative and the pointer in measuring the minimum density value of the negative indicates the grade of paper to be used for the particular negative and the sensitivity of the particular indicated paper is selectively indicated by the relative position of said dial members, the number of seconds exposure to be given in order satisfactorily to print from said negative on said paper will register with the position of the pointer as it measures the illumination of the printing light at the location to be occupied by the printing paper.

8. A device in accordance with claim 1 in which the means for concentrating said light on the small aperture is an optical system having one focal point at the aperture and supported from the surface which contains said aperture by insulating means to prevent heat conduction to said surface and to the negative in contact with said surface and in which the source of light is a concentrated source and is adjustably mounted so as to locate it at the other focal point and in which a filter is interposed in said light system which selectively favors the transmission of the blue end of the visible spectrum with respect to the red end and also excludes a substantial portion of the infra red and heat frequencies from said negative and in which said container is vented to permit the escape of heat.

9. A device in accordance with claim 1 in which the means for concentrating said light on the small aperture is an optical system having one focal point at the aperture and supported from the surface which contains said aperture by insulating means to prevent heat conduction to said surface and to the negative in contact with said surface, and in which the source of light is a concentrated source and is supported from a second surface and is adjustably mounted so as to locate it at the other focal point, and in which a filter is supported from said second surface and interposed in said light system, said filter selectively favoring the transmission of the blue end of the visible spectrum with respect to the red end and also excluding a substantial portion of the infra red and heat frequencies from said negative, and in which said container is vented between said two surfaces to permit the escape of heat.

10. A device useful in determining the proper exposure in photographic printing comprising an opaque container having a small aperture in one surface, a concentrated source of light within said container, means for concentrating a substantial portion of said light on said small aperture, a photoelectric cell, means for mounting said cell over said aperture so that a photographic negative may be inserted between said aperture and said cell and in contact with said aperture and so that said photo-electric cell is supported a substantial distance above said aperture so that the light passing through said aperture and through said negative will spread out over a greater surface of said cell than if said cell were in contact with said negative, adjustable means on said mounting so that said mounting and said photo-electric cell may be withdrawn from said aperture to allow the negative to be held a sufficient distance above said aperture to permit the cone of light from said aperture to spread out over a substantial part of said negative to facilitate selection of the point the density of which is to be measured, means for releasing said photo-electric cell from said mounting without disturbing its electrical connections, flexible electrical connections to said photo-electric cell to permit said cell when removed from said mounting to be placed in the position to be occupied by the printing paper so as to intercept a portion of the printing light, a meter in circuit with said cell to measure the response of said cell to the light impinging thereon, said meter having two scales, one scale being in densities to measure the densities of different portions of said negative and the other scale being in units to measure the illumination at the position of said printing paper from said printing light, said means for concentrating said light on said small aperture comprising an optical system having one focal point at the aperture and supported from the surface which contains said aperture by insulating means to prevent heat conduction to said surface and to the negative in contact with said surface, and said concentrated source of light being adjustably mounted so as to locate it at the other focal point, a filter interposed in said light system which selectively favors the transmission of the blue end of the visible spectrum with respect to the red end and also excludes a substantial portion of the infra red and heat frequencies from said negative, and said container being vented to permit the escape of heat.

11. A device useful in determining the proper exposure in photographic printing in accordance with claim 10 in which the concentrated source of light and the filter are supported from a different surface than the one which supports the optical system and in which the container is vented between said two surfaces.

12. A device useful in determining the proper exposure in photographic printing comprising an opaque container having a small aperture in one surface, a concentrated source of light within said container, means for concentrating a substantial portion of said light on said small aperture, a photo-electric cell, means for mounting said cell over said aperture so that a photographic negative may be inserted between said aperture and said cell and in contact with said aperture and so that said photo-electric cell is supported a substantial distance above said aperture so that the light passing through said aperture and through said negative will spread out over a greater surface of said cell than if said cell were in contact with said negative, adjustable means on said mounting so that said mounting and said photo-electric cell may be withdrawn from said aperture to allow the negative to be held a sufficient distance above said aperture to permit the cone of light from said aperture to spread out over a substantial part of said negative to facilitate selection of the point the density of which is to be measured, means for releasing said photo-electric cell from said mounting without disturbing its electrical connections, flexible electrical connections to said photo-electric cell to permit said cell when removed from said mounting to be placed in the position to be occupied by the printing paper so as to intercept a portion of the printing light, a meter in circuit with said cell to measure the response of said cell to the light impinging thereon, said meter having two scales, one scale being in densities to measure the densities of different portions of said negative and the other scale being in units to measure the illumination from said printing light at the position to be occupied by the paper, said two scales being substantially diametrically opposite to one another and having radial divisions corresponding to equal increments uniformly spaced, said meter having a single movable member extending in two radial directions from the pivot point to form two pointers which cooperate with said two scales respectively whereby each scale has a separate pointer, lead lines from the uniform divisions on each scale to the corresponding position of its pointer, a first movable dial member rotatable about the center of the two scales of the meter and bearing an indicator which can be set in registration with that one of the uniform divisions on the density scale which corresponds to the position of the pointer when it is indicating the maximum density of the negative and also bearing, at a point removed from said indicator, notations corresponding to the grade of paper which will reproduce the density difference of the negative said notations being spaced so as to register with the uniform divisions of the density scale and so that one of them will be indicated by the pointer when it indicates the minimum density of said negative, a second movable dial member rotatable about the center of the two scales of the meter and bearing numbers which correspond to the number of seconds exposure to be given and which are spaced in regular increments in radial divisions equal to the other radial divisions and register radially with the divisions of the illumination scale whereby when the pointer which cooperates with the illumination scale of the meter is indicating the illumination of the printing light at the position to be occupied by the paper it will simultaneously indicate a number of seconds on said exposure scale, an additional series of numbers on one of said movable dial members which numbers correspond to the paper sensitivity and are spaced on the arc of a circle having its center in common with said movable dial members and in radial divisions equal to the other radial divisions, means carried by the other of said movable dial members for selectively indicating only one of said sensitivity numbers at a time whereby, after said first dial member is set so that its indicator is in accordance with the maximum density of the negative and the pointer in measuring the minimum density value of the negative indicates the grade of paper to be used for the particular negative and the sensitivity of the particular indicated paper is selectively indicated by the relative position of said dial members, the number of seconds exposure to be given in order satisfactorily to print from said negative on said paper will register with the position of the pointer in measuring the illumination of the printing light at the position to be occupied by the printing paper.

13. A meter to be used in connection with a photo-electric cell for determining the proper grade of paper to use in printing photographic negatives and the proper time of exposure to give which comprises a movable member having two pointers extending in different radial directions, means to actuate the pointers in accordance with the density of the negative and in accordance with the value of illumination of the printing light at the location occupied by the paper during exposure, a scale cooperating with one of said pointers and containing divisions corresponding to the position of the pointer when it indicates densities of the negative, a second scale cooperating with the other of said pointers and containing divisions corresponding to the position of its pointer when it is indicating the value of illumination of the printing light, lead lines on each scale from each of said divisions to corresponding uniformly spaced radial divisions, a first movable dial member rotatable about the center of the two scales of the meter and bearing an indicator which can be set in registration with that one of the uniform divisions on the density scale which corresponds to the position of the pointer when it is indicating the maximum density of the negative and also bearing, at a point removed from said indicator, notations corresponding to the grade of paper which will reproduce the density difference of the negative said notations being spaced so as to register with the uniform divisions of the density scale and so one of them will be indicated by the pointer when it indicates the minimum density of said negative, a second movable dial member rotatable about the center of the two scales of the meter and bearing numbers which correspond to the number of seconds exposure to be given and which are spaced in regular increments in radial divisions equal to the other radial divisions so as to register radially with the uniform divisions of the light intensity scale whereby when the pointer which cooperates with the light intensity scale of the meter is indicating the illumination of the printing light at the paper location it will simultaneously indicate a number of seconds on said exposure scale, an additional series of numbers on one of said movable dial members which numbers correspond to the paper sensitivity and are spaced on the arc of a circle having its center in common with said movable dial members and in radial divisions equal to the other radial divisions, means carried by the other of said movable dial members for selectively indicating only one of said sensitivity numbers at a time whereby, after said first dial member is set so that its indicator is positioned in accordance with the maximum density of the negative and the pointer in measuring the minimum density value of the negative indicates the grade of paper to be used for the particular negative and the sensitivity of the particular indicated paper is selectively indicated by the relative position of said dial numbers, the number of seconds exposure to be given in order satisfactorily to print from said negative on said paper will register with the position of the pointer in measuring the illumination of the printing light at the location to be occupied by the paper in printing.

14. A device useful in determining the proper exposure in photographic printing comprising an opaque container having a small aperture in one surface, a source of light within said container, means for concentrating a substantial portion of said light on said small aperture, a photoelectric cell, a support for said cell mounted on said container mechanically connecting the cell with the container and holding the cell above said aperture to receive the light that passes through said aperture and through a selected portion of a negative placed between said aperture and said cell when it is desired to measure the density of the negative, a meter mounted on said container, flexible electrical connections permanently connecting said cell in circuit with said meter, and means for releasing said cell from its position over said aperture and from its mechanical connection with the container so that it may be moved away from said container when it is desired to measure the illumination of the printing light in the position to be occupied by the printing paper, said electrical connections being of sufficient length to permit said cell when removed from its position over said aperture and released from its mechanical connection with the container to be placed in a remote position to be occupied by a printing paper in the path of the printing light, and said meter having two scales, one scale being in densities to measure the response of said cell to the light passing through the selected portion of the negative when the cell is held by the support above the aperture in the container and the other scale being in units to measure the illumination from the printing light when the cell is placed in the position to be occupied by the printing paper.

HARVEY P. ROCKWELL, Jr.

CERTIFICATE OF CORRECTION.

Patent No. 2,235,590. March 18, 1941.

HARVEY P. ROCKWELL, JR.

It is hereby certified that error appears in the printed specification of the above numbered patent requiring correction as follows: Page 1, second column, line 14, for "apparatups" read --apparatus--; line 43, for "intra" read --infra--; page 2, second column, line 4, after "scale" first occurrence, insert the word --plate--; line 75, for "dial 27" read --dial 28--; page 4, second column, line 17, for "correspnods" read --corresponds--; line 56, before "illumination" insert --the--; and that the said Letters Patent should be read with this correction therein that the same may conform to the record of the case in the Patent Office.

Signed and sealed this 22nd day of April, A. D. 1941.

(Seal)

Henry Van Arsdale,
Acting Commissioner of Patents.